May 23, 1961 C. K. HIRSCH 2,985,470
PIPE COUPLING FOR SANITARY PIPE LINES
Filed Nov. 26, 1957
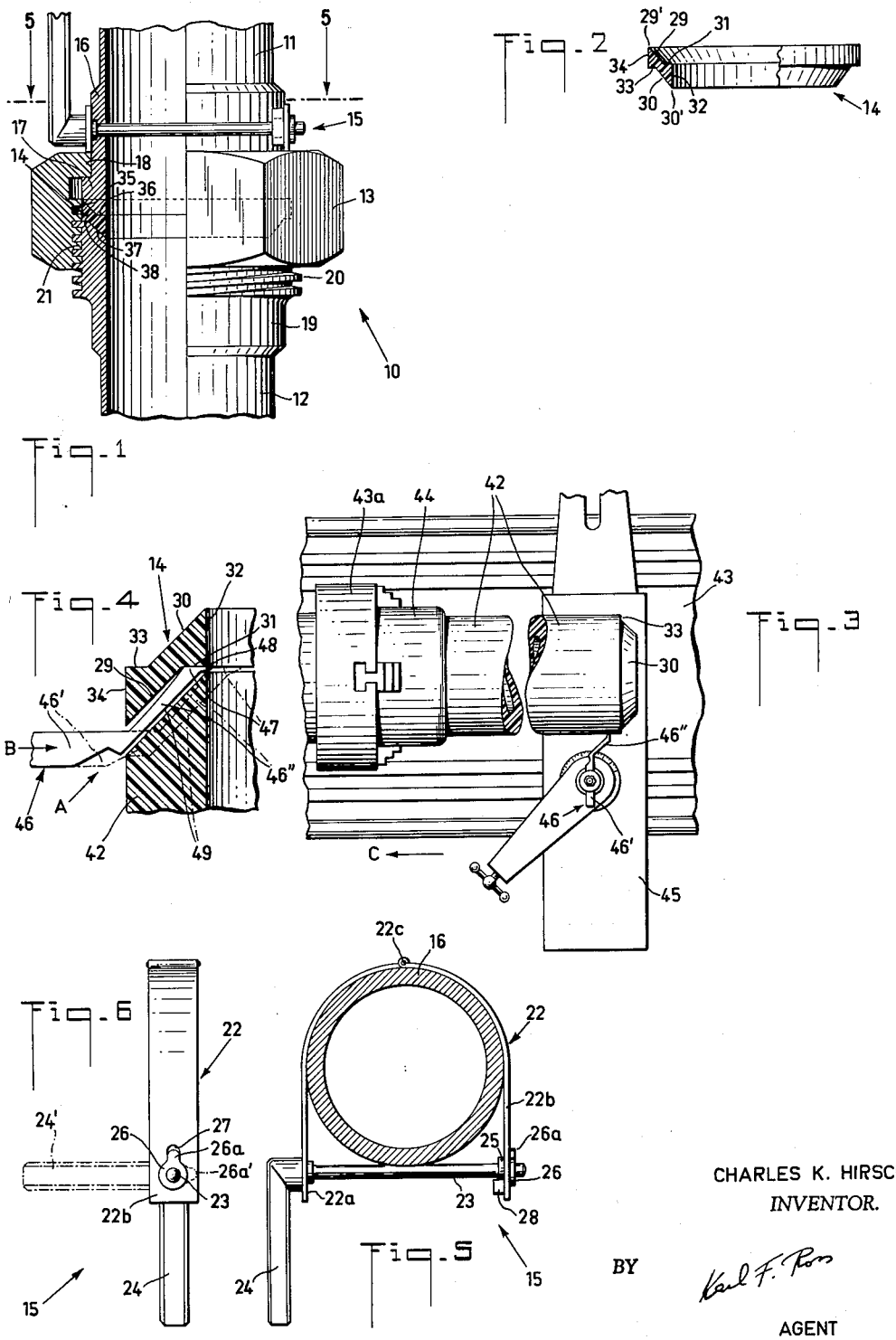
CHARLES K. HIRSCH
INVENTOR.
BY
AGENT

United States Patent Office 2,985,470
Patented May 23, 1961

2,985,470
PIPE COUPLING FOR SANITARY PIPE LINES
Charles K. Hirsch, 195 Claremont Ave., New York, N.Y.
Filed Nov. 26, 1957, Ser. No. 699,113
1 Claim. (Cl. 285—332.3)

My present invention relates to improvements in sanitary pipe lines and unions as used in dairies or other branches of the food industry and in certain chemical industries.

An important object of the invention is to provide an improved gasket for use in pipe unions of the above character which remains unaffected by the cleaning media passed through the pipe lines and may be employed in pipe unions of known construction.

Another object of the invention is to provide a gasket for pipe unions used in the aforementioned industries which is of such shape as completely to seal the gap between two adjacent pipe terminals without unduly lengthening the union.

A further and more specific object of the invention is to provide a gasket of resilient, acid-resistant plastic material which can be positively guided and properly located in nut-type pipe unions of known construction.

An additional object of the invention is to provide a novel method of manufacturing gaskets for pipe unions used in food and chemical industries, the method requiring a limited number of steps and resulting in little waste of prefabricated material.

Yet another object of the invention is to provide means for differentiating between various pipe-line joints in a manner clearly indicating to an operator those pipe lines which must be cleaned or whose gaskets are to be replaced at frequent intervals, in contradistinction to other lines which do not require much servicing and are, therefore, not subject to periodical disassembly, being instead susceptible to cleaning in assembled position by being flushed through with a circulating fluid.

A still further object of the invention is to provide a means for preventing the spontaneous loosening of a pipe union incorporating my improved gasket. In processing plants, for example, the requirements for sanitary conditions are very strict, one such requirement being that the piping be taken apart daily and thereupon cleaned in vats. To that end, the lines must be quickly detachable and removable and, whenever possible, free from voids and crevices to prevent accumulations of foods and cleaning solutions. It has also been proposed to clean the piping without dismantling the lines by passing therethrough various washing and rinsing fluids which are basic and acidic in character. In the past, gaskets were sometimes omitted entirely or, where provided, took the form of simple paper washers. A joint without gaskets will not, however, form a continuous inner surface, thus giving rise to recesses in which waste matter may accumulate, whereas paper gaskets cannot be employed if acids are passed through the piping as the paper either absorbs the liquids or disintegrates after short periods of use. An additional drawback of paper gaskets is that they leave an annular clearance of triangular cross-section between adjacent terminals of conventional nut-type unions which again permit accumulation of conveyed cleaning solutions or other compounds.

Recently, specially shaped gaskets of synthetic plastic material such as polymeric tetrafluoromethane have come into use which partially avoid the above drawbacks by being better able to withstand the effects of cleaning solutions and being of such shape as to present a large, continuous, flush interior surface to the flow of conveyed products and cleaning solutions. Conventional designs of such gaskets, however, are not entirely satisfactory in that they either call for excessive width of the gasket, which unduly reduces the number of threads available for the mating engagement of the coupling members, or afford insufficient guidance to insure properly centered seating thereof in the pipe joint. The invention, in accordance with one of its features, provides a gasket of small effective thickness and large seating surface by forming the gasket with a pair of conical surfaces of like apex angle which together with its cylindrical inner and outer surfaces define a sharp inner and a sharp outer edge, and by chamfering either or both of the obtuse corners of the resulting parallelogrammatic cross-section to form one or preferably two radially extending shoulders.

If two shoulders are provided, they may be made almost or entirely co-planar so that the gasket, though being of considerable width at both its outer and its inner periphery, has a small effective thickness as measured between the two conical surfaces. These conical surfaces and the shoulders of my improved gasket provide a large contact area with the adjacent pipe terminals whereby proper alignment of its bore with the inner pipe surfaces is insured.

Inasmuch as an accurately machined gasket of plastic material would be objectionably deformed if substantial pressure were used to clamp it in position, the invention further contemplates the provision of special locking means adapted to prevent the spontaneous loosening of the usual retaining nut joining adjacent pipe terminals together.

The invention also contemplates the serial production of gaskets of the aforedescribed character by slicing them from solid tubular stock with the aid of a cutting tool specially designed to minimize waste, this tool having a basically parallelogrammatic bit portion with a cutting edge extending along at least one of the narrower sides of the parallelogram.

The above and other objects, feautres and advantages of my invention will become more fully apparent in the course of the following description of certain embodiments selected for illustration in the accompanying drawing, and the invention will be finally pointed out in the appended claim.

In the drawing:

Fig. 1 is a partly elevational and partly sectional view of a pipe union according to the invention;

Fig. 2 illustrates in partial section a gasket forming part of the union of Fig. 1;

Fig. 3 is a partial top plan view of a lathe bed with a cutting tool for continuously manufacturing gaskets of the form shown in Figs. 1 and 2;

Fig. 4 illustrates the sequence of steps performed by the cutting tool in the manufacture of gaskets shown in Figs. 1 and 2;

Fig. 5 is a transverse section taken on line 5—5 of Fig. 1, illustrating in greater detail a locking device forming part of the union; and Fig. 6 is an end view of the detached locking device.

As shown in Fig. 1 of the drawing, the pipe union 10 comprises an upper pipe 11, a lower pipe 12, a nut 13, a plastic gasket 14, and clamping mechanism generally indicated by numeral 15. Upper pipe 11 has a collar 16 terminating at its lower end in an external annular flange 17 which engages the internal flange 18 of nut 13. The lower pipe 12 has a head 19 whose upper part is externally threaded, as indicated at 20, its threads meshing with internal threads 21 in the nut 13 to hold the assembly of members 11, 12 and 13 in the position shown in Fig. 1.

The locking device 15, whose purpose is to prevent loosening of union 10 as a result of vibrations of pipes 11 and 12, comprises a U-shaped stirrup 22 of sheet metal or the like, which surrounds one-half of the reinforced zone 16 adjacent the upper face of nut 13, and a shaft 23 having one end rigidly connected with a handle 24 and rotatably held in the leg 22a of the U-shaped stirrup. The other end of shaft 24 carries a cam 25 and a retaining lug 26, the latter being of such configuration as to fit into the keyhole slot 27 provided in the other leg 22b of the stirrup. The two legs of stirrup 22 are pivotally joined by a pin 22c. At its inner side and adjacent cam 25, the leg 22b carries a transverse stop 28 which cooperates with the cam in such manner as to tighten the stirrup 22 around collar 16 when the handle 24 is rotated through ninety degrees into its dot-dash position 24' as shown in Fig. 6.

When the handle 24 is so turned, the projection 26a of retaining lug 26, which rotates with the shaft 23, is in the position 26a' and thus prevents movement of leg 22b in axial direction toward and past the free end of shaft 23. To remove stirrup 22 from the collar 16, handle 24 is turned back into its position shown in Fig. 5, whereupon the leg 22b is free to pivot outwardly since the retaining lug 26 with its projection 26a is aligned with and passes through the keyhole slot 27. The nut 13 may then be unscrewed and the pipe union 10 taken apart for cleaning, inspection or replacement of gasket 14.

The joint 11—13 may be one which need not be taken down daily, hence the handle 24 of its locking device 15 may be distinctively shaped to differentiate it from other unions requiring more frequent servicing.

Gasket 14, also shown in Figs. 2 and 4, has an inner conical surface 29, an outer conical surface 30, an inner shoulder 31 between its bore 32 and surface 29, and an outer shoulder 33 between its peripheral surface 34 and inclined surface 30. As may be observed in Fig. 1, surface 29 and shoulder 31 of the gasket are flush with respective surfaces 35, 36 at the lower end of pipe 11, and the outer surface 30 and shoulder 33 are in contact with respective surfaces 37, 38 at the upper end of lower pipe 12. The periphery 34 of gasket 14 is flush with the periphery of flange 17 and its bore 32 is coaxial with and of a diameter equal to that of the bores in pipes 11 and 12. The nut 13 should not be drawn so tight as to cause cold flow of the plastic material; after moderate clamping pressure has been applied to the nut by means of a suitable wrench, locking device 15 is placed next to it on collar 16 to prevent its spontaneous detachment from pipe 12.

It will be seen that the outer diameter of gasket 14 is so selected as to provide a sliding fit in the nut 33. Its cylindrical surface 34 is of sufficient width in axial direction, as by exceeding the pitch of the female threads 21 so as to bridge at least two of these threads, to be maintained in accurately centered position by the inner surface of the nut bearing the threads 21 which, insofar as they are not obstructed by the gasket, engage the male threads 20 on the head 19 of pipe 12. The presence of outer shoulder 33 enables the desired width of periphery 34 to be maintained in a gasket of greatly reduced axial thickness, corresponding to a small spacing between the beveled seating surfaces 35 and 37. Moreover, the conical surfaces 29, 30 and the radial shoulders 31, 33 afford very good fit of relatively large overall area against the adjacent terminal surfaces of pipes 11 and 12. The sharp annular outer and inner edges 29' and 30' (Fig. 2) define diagonally opposite corners on the cross-section of the gasket.

The cutting of gaskets 14 from an elongated tubular piece of plastic stock 42 is shown in Figs. 3 and 4. As illustrated in Fig. 3, lathe bed 43 supports the chuck 43a which is rotated by a motor (not shown) and in turn rotates the tube 42 held in the chuck by an annular member 44. Tool carrier 45, which is movable longitudinally and transversely with respect to lathe bed 43, adjustably supports the shank 46' of cutter 46 whose roughly parallelogrammatic bit portion 46" is shown drawn to a larger scale in Fig. 4. In its position illustrated in Fig. 3, tool 46 is about to enter into the material of plastic tube 42. The tool is first moved in the direction of arrow A (see Fig. 4) whereby its edge 47, terminating in a sharp beak 48, separates a gasket 14 from tube 42 by cutting therein the inclined surface 29 and the shoulder 31. When the cutter 46 reaches its position shown in full lines in Fig. 4, the gasket 14 is completely severed from the tubular stock 42, whereupon the tool is moved in direction of arrow B, i.e. perpendicularly to the axis of tube 42, into the dot-dash position whereby its cutting edge 49 defines the outer surface 30 and the shoulder 33 of the next-following gasket. The tool is then withdrawn and the carrier 45 moved in the direction of arrow C (see Fig. 3) to repeat the above-described steps in the same sequence. It will be seen that cutting and shaping of gaskets 14 is a two-step operation.

Fig. 4 shows that the stock is cut initially along an annular zone of trapezoidal cross-section, the non-parallel sides of the trapezoid extending respectively in radial and in axial direction, and that in the two-step process of Fig. 4 there occurs a subsequent widening of the annular zone by a radial inward displacement of the said trapezoidal cross-section.

The invention is, of course, not limited to the specific embodiments described and illustrated but may be realized in various modifications and adaptations without departing from the spirit and scope of the appended claim.

I claim:

In a pipe union, in combination, a first pipe terminating in a head with male threads, a second pipe terminating in an outer annular flange, said head and said flange being provided with confronting annular faces of generally conical configuration and like inner diameters, one of said faces having a radial-plane outer annular shoulder and a conical recess adjoining said outer shoulder, the other of said faces having a radial-plane inner annular shoulder and a conical projection adjoining said inner shoulder, a nut having an internal flange traversed by said second pipe and engaging said outer flange, said nut being provided with female threads engaging said male threads, and an annular deformable gasket of substantially inelastic synthetic resinous material inserted within said nut between said faces, said gasket being of generally parallelogrammatic cross-section and having an inner annular periphery aligned with the inner walls of said pipes and an outer annular cylindrical surface having a diameter substantially equal to the root diameter of said male threads, said outer cylindrical surface having an axial length greater than the pitch of said female threads, the end faces of said gasket being substantially complementary to said confronting annular faces respectively, said gasket faces having an inner and an outer shoulder lying flat against the corresponding shoulders of said faces in substantially the same radial plane, the shoulders of said gasket being of substantially the same radial depth, an inner concavely conical face in full contact with said projection, and an outer convexly conical face in full contact with said recess, said nut maintaining said pipes in tight contact with said gasket.

References Cited in the file of this patent
UNITED STATES PATENTS

| 299,206 | Deans | May 27, 1884 |
|---|---|---|
| 509,743 | Lane | Nov. 28, 1893 |
| 592,820 | Normoyle | Nov. 2, 1897 |
| 817,058 | Greenfield | Apr. 3, 1906 |
| 828,230 | Michel | Aug. 7, 1906 |

(Other references on following page)

UNITED STATES PATENTS

| | | |
|---|---|---|
| 1,027,565 | Ramage | May 28, 1912 |
| 1,303,098 | Merz | May 6, 1919 |
| 1,691,851 | McCuean | Nov. 13, 1928 |
| 1,830,027 | Hayden | Nov. 3, 1931 |
| 2,272,222 | Mullen | Feb. 10, 1942 |
| 2,309,260 | Strauss | Jan. 26, 1943 |
| 2,673,751 | Finch | Mar. 30, 1954 |
| 2,688,791 | Luers | Sept. 14, 1954 |
| 2,713,714 | Krause | July 26, 1955 |
| 2,780,483 | Kessler | Feb. 5, 1957 |
| 2,786,696 | Feldmeier | Mar. 26, 1957 |
| 2,789,844 | Kessler | Apr. 23, 1957 |
| 2,790,661 | Tamminga | Apr. 30, 1957 |

FOREIGN PATENTS

| | | |
|---|---|---|
| 148,410 | Austria | Jan. 25, 1937 |